A. B. DISS.
SOCKET FOR CASTER PINTLES.
APPLICATION FILED APR. 14, 1914.
1,125,272.
Patented Jan. 19, 1915.
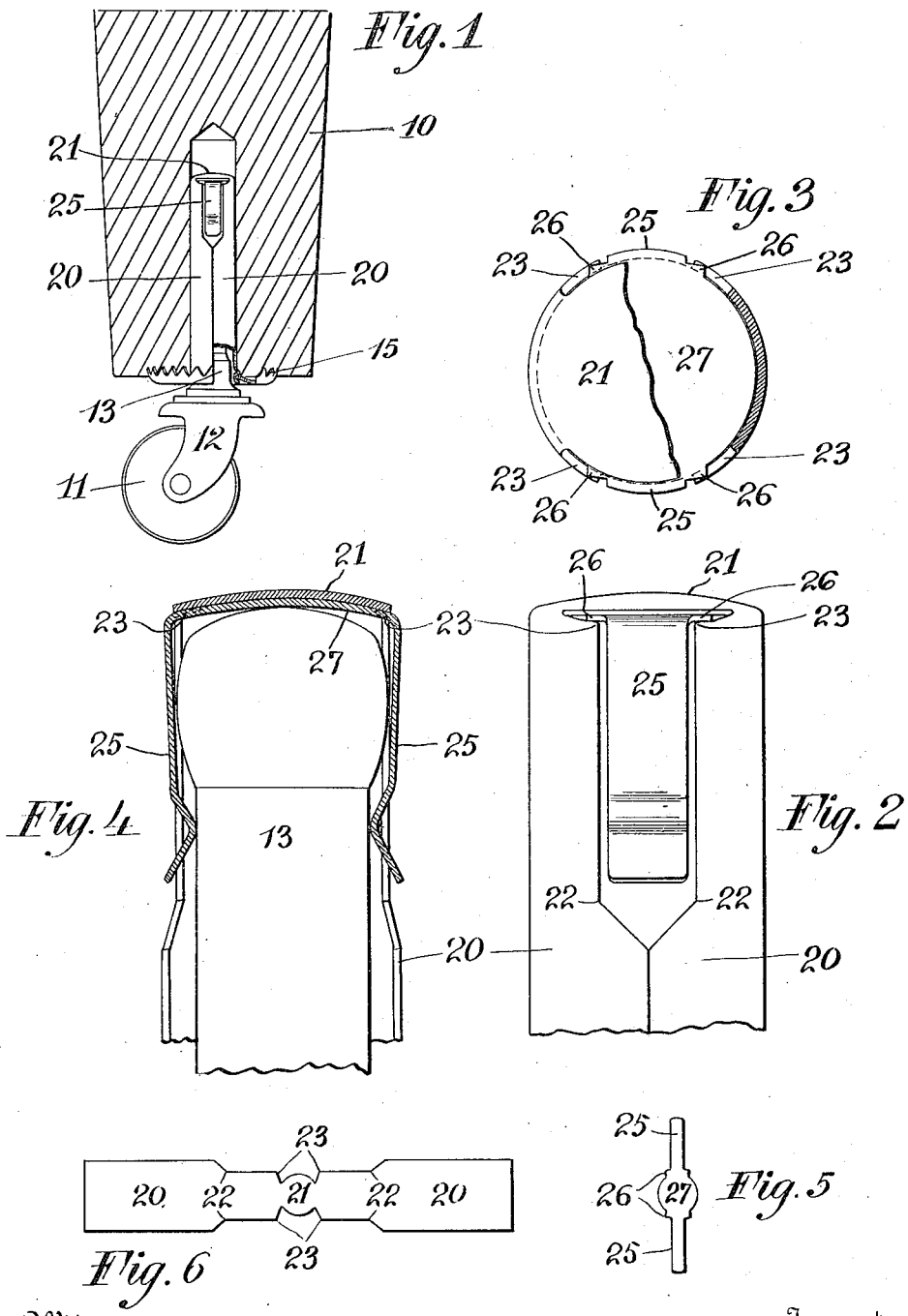

UNITED STATES PATENT OFFICE.

ALBERT B. DISS, OF NEWARK, NEW JERSEY, ASSIGNOR TO UNIVERSAL CASTER & FOUNDRY COMPANY, OF NEW YORK, N. Y., A CORPORATION OF NEW JERSEY.

SOCKET FOR CASTER-PINTLES.

1,125,272. Specification of Letters Patent. Patented Jan. 19, 1915.

Application filed April 14, 1914. Serial No. 831,722.

*To all whom it may concern:*

Be it known that I, ALBERT B. DISS, a resident of Newark, New Jersey, have invented certain new and useful Improvements in Sockets for Caster-Pintles, of which the following is a specification accompanied by drawings.

The invention is designed primarily for caster sockets adapted to be driven into wooden furniture to form a sleeve or bearing for the pintle of the caster, the pintle being detachably retained in the socket by a spring which is usually part of the socket, but the utility of the invention is not restricted to such furniture.

The main object of the invention is to provide a simple, inexpensive, but thoroughly reliable and durable construction of caster socket, combining a socket proper, which can be made of sheet steel soft enough to be readily bent or pressed to the requisite shape without injury to the material, and an inset of spring steel or suitable spring metal fixed in the socket and forming a spring in position to act upon and secure the pintle against dropping out.

Certain further objects of the invention as embodied in the preferred form illustrated will appear from the following description.

If ball bearings are not used for reducing the friction of rotation of the pintle and a top bearing for the pintle is desired, the inset of spring steel, which forms the retaining spring for the pintle, is so constructed and held that it also forms a relatively hard smooth end bearing for the head of the pintle and thereby directly carries the weight on the head of the pintle.

In the accompanying drawings, the preferred embodiment of the invention is illustrated, wherein—

Figure 1 is a side view of the complete caster and socket shown in place in a wooden leg, which is seen in section, as is also a part of the socket; Fig. 2 is an enlarged detail view of the upper portion of the socket; Fig. 3 is a top view of the socket, partly broken away to show the inset of spring steel; Fig. 4 is a central vertical section of the upper end of the socket at right angles to Fig. 2 and showing the head of the pintle in place; Fig. 5 shows the blank from which the inset or spring is formed; and Fig. 6 shows the blank from which the remainder of the socket proper is formed.

A wooden furniture leg is indicated at 10, centrally bored to tightly fit the socket when driven into it. A caster wheel 11, jaws or horn 12 and pintle 13 are shown of the usual construction, the pintle having an enlarged upper end, forming a head approximately fitting and bearing laterally within the pintle socket, and an enlarged lower portion, also approximately fitting and having its bearing against the interior of the socket.

The socket as a whole comprises the leg-carrying plate 15, the sleeve or socket proper, the side members of which are marked 20, and the spring steel inset, the spring arms of which are marked 25. The leg-carrying plate 15 shown has an upturned outer serrated edge adapted to penetrate the wood of the furniture leg, and is secured to the lower end of the sleeve or socket proper by enlarging or upsetting the sleeve above and below the leg-carrying plate 15, so that the two sleeve members and the plate are riveted firmly together.

The present improvements concern more particularly the construction of the sleeve at its upper portion and the spring steel inset. The spring steel inset, formed from a blank shaped as in Fig. 5, comprises a circular center 27. spring tongues or arms 25 bent downward and inward as in Fig. 4, and projecting shoulders 26 at the roots of the arms, which shoulders form engaging members which engage and are interlocked between overlying and underlying portions of the sleeve, as will presently be described. The circular central part 27 of the spring inset is domed or dished upward jointly with the upper end of the sleeve or socket, so that it lines the upper end of the sleeve or socket, and, by being so domed or dished with the socket end, it is more securely held against being laterally displaced therefrom than if it were flat. The circular center 27 of the inset is made of the same diameter as the interior diameter of the upper end of the socket, so as to tightly fit the same when in place.

The sleeve or socket proper comprises a center 21 forming the end or top, which is preferably circular and preferably of approximately the same size as the circular center of the inset, and two side members or sleeve members 20. The sleeve members 20 are partly cut away or narrowed laterally, as at 22, to give clearance for the spring arms 25, and near their junction with the center or top 21 of the socket they are formed with shoulders 23 shaped to fit tightly under and be compressed against the under surface of the shoulders 26 of the inset. The shoulders 26 project in the radial line about the thickness of the metal of the shoulders 23, so that they are secured by the latter without projecting beyond the outer diameter of the sleeve, as is best seen in Fig. 3.

The preferred method of assembling the inset and the sleeve will aid in understanding the proper proportioning of the engaging parts in order that they may be tightly bound together. Preferably the spring arms 25 of the inset are first bent downward to their shape as shown in Fig. 4, and the inset is then sprung onto the top of a pin-like support, over which the socket member is to be finally bent and pressed. The side members 20 of the sleeve or socket member are first bent to their semi-circular form, and then the center or top 21 is laid upon the inset and the sides 20 bent down, preferably by a suitable die and press. In so doing, the engaging members or shoulders 23 of the sleeve pass under and are forced or jammed tightly beneath the engaging members or shoulders 26 of the inset, and, at the same time preferably, the doming or rounding of the circular centers or tops of both the inset and of the sleeve is effected. The shoulders 26 are tightly confined between the shoulders 23 of the sleeve members and the top 21 of the socket. Thus it will be seen that the socket is provided with a relatively hard spring steel inset, the spring arms 25 of which are adapted to yield to allow the head of the pintle to pass freely up and, by springing back again beneath the head, as in Fig. 4, they will prevent the accidental dropping out of the pintle when the furniture leg is raised. Also, the circular center of the spring steel inset forms a hard end bearing lining the end of the socket for receiving the end thrust of the top of the pintle, if it is not desired to provide ball bearings or locate the thrust bearings around the lower part of the pintle. The spring arms 25 should normally clear the head of the pintle and press either very lightly or not at all against the reduced neck of the pintle below the head. The head should loosely but substantially fit within the sleeve, so as to form with the sleeve a journal and journal bearing.

In the drawings and foregoing description, the minor details are those preferred for the embodiment of the invention as applied to top-bearing casters for wooden legs without ball bearings; but, of course, the invention permits considerable variation without material departure from it.

I claim the following:

1. A socket for a caster pintle, comprising a sleeve of sheet metal of size approximately fitting the appropriate caster pintle and an inset of spring metal interlocked with the sleeve near its upper end and having a spring arm adapted to act inward and retain the pintle, said spring arm being in approximately the same longitudinal line with the side wall of the sleeve, which is cut away or open to give clearance to the arm.

2. A socket for a caster pintle, comprising a sleeve of bent sheet metal having a top member and down-bent side members, and an inset of spring metal adapted to resiliently retain a pintle and interlocked between said top member of the sleeve and portions of the down-bent side members.

3. A socket for a caster pintle, comprising a sleeve of bent sheet metal having a top member and down-bent side members, and an inset of spring metal having an end bearing member for a pintle and spring arms and engaged and interlocked by and between the said top member and portions of the side members of the sleeve.

4. A socket for caster pintles comprising a sleeve of bent sheet-metal formed with an upper end member and downwardly bent and extending sleeve members and an inset of spring metal engaged and held by and between the said upper end member and the sleeve members and having arms for acting on the pintle, the sleeve members being cut away laterally to give clearance for the said arms.

5. A socket for caster pintles comprising a sleeve of bent sheet-metal formed with an upper end member and downwardly bent and extending sleeve members and an inset having spring arms and a transverse member adapted to form a top bearing for a pintle and engaged and held by and between the said end member of the socket and the sleeve members, the said spring arms extending and acting in intervals between the sleeve members.

6. A socket for caster pintles comprising a sleeve adapted to receive the pintle and an inset of spring metal, said inset being secured in the upper end of the socket by means of underlying and overlying engaging portions of the said socket, and having one or more downwardly extending spring arms adapted to act on the pintle to retain it in the socket.

In testimony whereof I have signed this specification in the presence of two subscribing witnesses, this 10th day of April, 1914.

ALBERT B. DISS.

Witnesses:
 HAROLD BINNEY,
 A. PSCHIERER.